July 24, 1934.  W. H. H. PUCKETT  1,967,427
FISHING ROD HOLDER
Filed Sept. 15, 1932
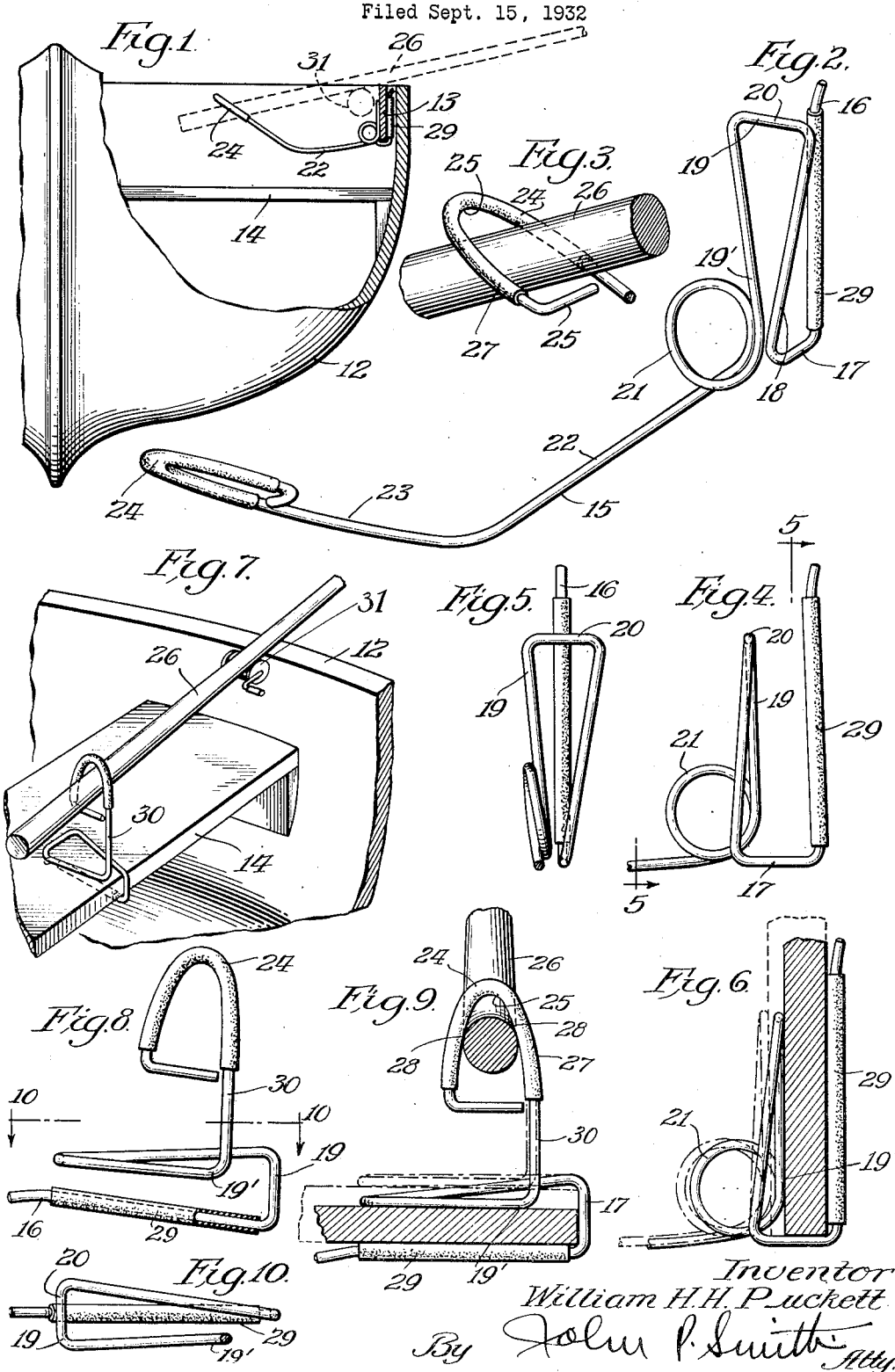
Inventor
William H. H. Puckett
By John P. Smith Atty.

Patented July 24, 1934

1,967,427

UNITED STATES PATENT OFFICE 1,967,427

FISHING ROD HOLDER

William H. H. Puckett, Chicago, Ill.

Application September 15, 1932, Serial No. 633,281

1 Claim. (Cl. 248—37)

The present invention relates to fishing rod holders, and has for its primary object to provide a novel, improved, as well as simplified means for supporting a fishing rod on a boat in adjustable relation with respect to the water.

A further object of the invention is to provide a novel and improved fishing rod holder which can be quickly and easily attached to the side of a boat or to the seat thereof, and in which the holder is made of a single piece of material.

Another object of the invention is to provide a novel and improved form of fishing rod holder for fishing boats in which a single piece of wire is so constructed and of sufficient flexibility that the same may be readily adjusted for frictionally securing the holder to various parts of the boat, so that the fishing rod may be adjustably secured to the boat at various angles with respect thereto.

These and other objects are accomplished by providing a construction and arrangement of the various parts in the manner hereinafter described, and particularly pointed out in the appended claim.

Referring to the drawing, Fig. 1 is a front elevational view partly in cross section of a boat, showing my improved fishing rod holder attached thereto, with the fishing rod shown in broken lines;

Fig. 2 is a perspective view of the fishing rod holder shown in Fig. 1;

Fig. 3 is a fragmentary perspective view showing the manner in which the rod is frictionally gripped between the free end of the loop of the fishing rod holder;

Fig. 4 is a fragmentary side elevational view showing the clamping construction of the fishing rod holder shown in Figs. 1 and 2;

Fig. 5 is a cross sectional view taken on the line 5—5 in Fig. 4;

Fig. 6 is a side elevational view of the clamping portion of the fishing rod holder showing the flexibility of the same and the manner in which it may clamp the side cleats of the boat of various thicknesses;

Fig. 7 is a perspective fragmentary view of a portion of a boat showing a modified form of my fishing rod holder which is capable of being attached to the seat of a boat;

Fig. 8 is a perspective view of the modified form of fishing rod holder shown in Fig. 7;

Fig. 9 is a cross sectional view of the fishing rod and seat of the boat showing my modified form and its manner of attachment to the seat of the boat, and Fig. 10 is a cross sectional view taken on the line 10—10 in Fig. 8.

The present invention is directed to a novel, simple and compact fishing rod holder which may be quickly attached to or detached from a fishing boat, and at the same time stored away with the other fishing paraphernalia in the usual tin box or kit used by fishermen, without occupying much space therein.

In illustrating one form of my invention I have shown the same in connection with the conventional form of boat, a fragmentary portion of which is shown in Fig. 1 of the drawing, and generally indicated by the reference character 12. The boat 12 is provided with the usual inside longitudinally extending side cleat 13 and seat 14. My improved fishing rod holder is made from a single piece of wire, generally indicated by the reference character 15, and is provided with a frictionally engaging clamping portion, which is formed with a vertically extending member, as shown at 16. Continuing from this vertically extending member 16 and at right angles with respect thereto, is a horizontally extending portion 17 which continues inwardly and has an upwardly and angularly disposed portion as shown at 18, which in turn, is bent so as to form a substantially inverted U shaped portion, as shown at 19. The upper portion of this inverted U shaped portion is arranged horizontally as shown at 20, and is arranged to grip the inner surface of the cleat 13 of the boat 12 in parallel alignment therewith so as to prevent the free end of the loop portion of the fishing rod holder from lateral movement with respect to the side of the boat. Formed as a continuation of one of the legs of the inverted U shaped member 19 is a single coiled portion, as shown at 21, for giving the looped end portion of the fishing rod holder sufficient flexibility in the fishing rod without distorting or bending the clamping portion of the holder. Formed as a continuation of the coil 21 is an outwardly and horizontally extending portion 22 which has its outer end bent upwardly as shown at 23. The outer end of the upwardly extending portion 23 has a looped portion, as shown at 24, and has its extreme end bent substantially at right angles, as shown at 25 against the upwardly extending portion 23, as clearly shown in Figs. 1, 2 and 3 of the drawing.

It will be noted that the looped end portion 24 is of smaller circular diameter, as shown at 25, than the diameter of the handle of the fishing pole 26, so that the sides of the pole thereof wedge in and grip a rubber tube covering 27, at the point 28, as clearly shown in Figs. 3 and 9 of the drawing. In order to add a frictional grip to both of the clamps which clamp on to the cleat 13 of the boat and the looped portion which grips on to the handle 26 of the fishing pole, I have provided a rubber tube covering, as shown at 27 and 29 respectively. It will also be noted, by referring to Fig. 5 of the drawing, that the vertically extending portion 16 is positioned centrally between the longitudinal or horizontally extending portion 20 of the inverted U shaped portion of the holder 15 so as to prevent lateral movement of the free end of the fishing rod holder, and to hold the same firmly in position on the side of the boat or to the seat where it is attached. It will also be noted that one of the legs 19' of the inverted U shaped member 19 is normally depressed in closer proximity to the vertical portion 16 for the purpose of effectively clamping cleats of relatively small thicknesses.

In the modified form of my invention, as shown in Figs. 7 to 10 inclusive, the corresponding parts of this modified form are indicated by the same reference characters as the preferred form shown in Figs. 1 to 6 inclusive. The only difference being that the clamping member is adapted to engage the seat and the looped portion 24 thereof is connected to the clamp by vertically extending portion 30, without the coil intervening, for supporting the looped portion in position on the seat, as clearly indicated by the drawing, particularly Fig. 7 thereof.

Another important feature of the invention includes the use of the fishing cord reel 31 which is attached to the fishing pole 26 so that when the pole is inserted in the loop 24, the fishing pole may be adjusted so that the reel 31 engages the cleat or side of the boat, as clearly shown in Figs. 1 and 7, for further reinforcing or securing the pole in position and preventing its displacement therefrom. It will be quite obvious that the free end of the fishing rod holder may be easily adjusted by bending the coil 21 or the free end thereof so that the angle of the pole may be adjusted in accordance with the requirements of the operator. It will also be noted that the modified form shown in Figs. 7 to 10 inclusive, may be adjusted transversely of the seat 14 so as to secure the proper angle of the fishing pole in accordance with the requirements of the operator.

While in the above specification I have described one embodiment and one modification which my invention may assume in practice, it will of course, be understood that the same is capable of other modification, and that other modification may be made without departing from the spirit and scope of the invention as expressed in the following claim.

What I claim as my invention and desire to secure by Letters Patent is:

A fishing rod holder comprising a single piece of wire having a vertically extending portion, a substantially inverted U shaped portion spaced from said vertical portion for forming a clamping member, an elongated portion extending from said U shaped portion and having a loop formed on the end thereof for frictionally engaging a fishing rod, and a coil of said wire located adjacent said inverted U-shaped portion for resiliently supporting said rod on said holder.

WILLIAM H. H. PUCKETT.